United States Patent
Lemons et al.

[15] 3,701,393
[45] Oct. 31, 1972

[54] ARTICULATED TRACTOR

[72] Inventors: David Forrest Lemons, Cedar Falls; Gordon Le Roy Marquart, Jessup; Saul Herscovici, Waterloo, all of Iowa

[73] Assignee: Deere & Company, Moline, Ill.

[22] Filed: Oct. 30, 1970

[21] Appl. No.: 85,460

[52] U.S. Cl. ................... 180/51, 180/53 R, 180/89 R
[51] Int. Cl. ................................................. B60k 17/34
[58] Field of Search .......... 180/51, 50, 79.2 B, 53, 89

[56] References Cited

UNITED STATES PATENTS

| | | | |
|---|---|---|---|
| 1,623,214 | 4/1927 | Storey | 180/50 |
| 3,191,709 | 6/1965 | Symons | 180/51 |
| 3,211,498 | 10/1965 | Peller | 180/51 X |
| 3,411,809 | 11/1968 | Kampert et al. | 180/51 X |
| 3,572,457 | 3/1971 | Hill | 180/53 X |

*Primary Examiner*—Kenneth H. Betts
*Attorney*—H. Vincent Harsha, Harold M. Knoth, William A. Murray, John M. Nolan and Jimmie R. Oaks

[57] ABSTRACT

An articulated four-wheel drive tractor has front and rear frame structures joined by a vertical pivot. The front frame structure is supported on an oscillating front drive axle assembly and the rear frame structure is rigid with the rear drive axle assembly, which is directly connected to a change-speed transmission also on the rear frame structure. The transmission is driven by an engine on the front frame structure through an upper drive shaft, which crosses the axis of articulation at engine output speed and drives a gear train on the rear frame structure forwardly of the transmission. A second drive shaft extends forwardly from the transmission across the axis of articulation below the upper drive shaft and is connected at its forward end to the front drive axle assembly, the lower drive shaft like the upper drive shaft including a pair of universal joints equally distant to the front and to the rear of the pivot axis. An operator's station is mounted on the front frame structure above the pivots between the frame structures and the transmission is controlled from the operator's station through flexible cables.

10 Claims, 3 Drawing Figures

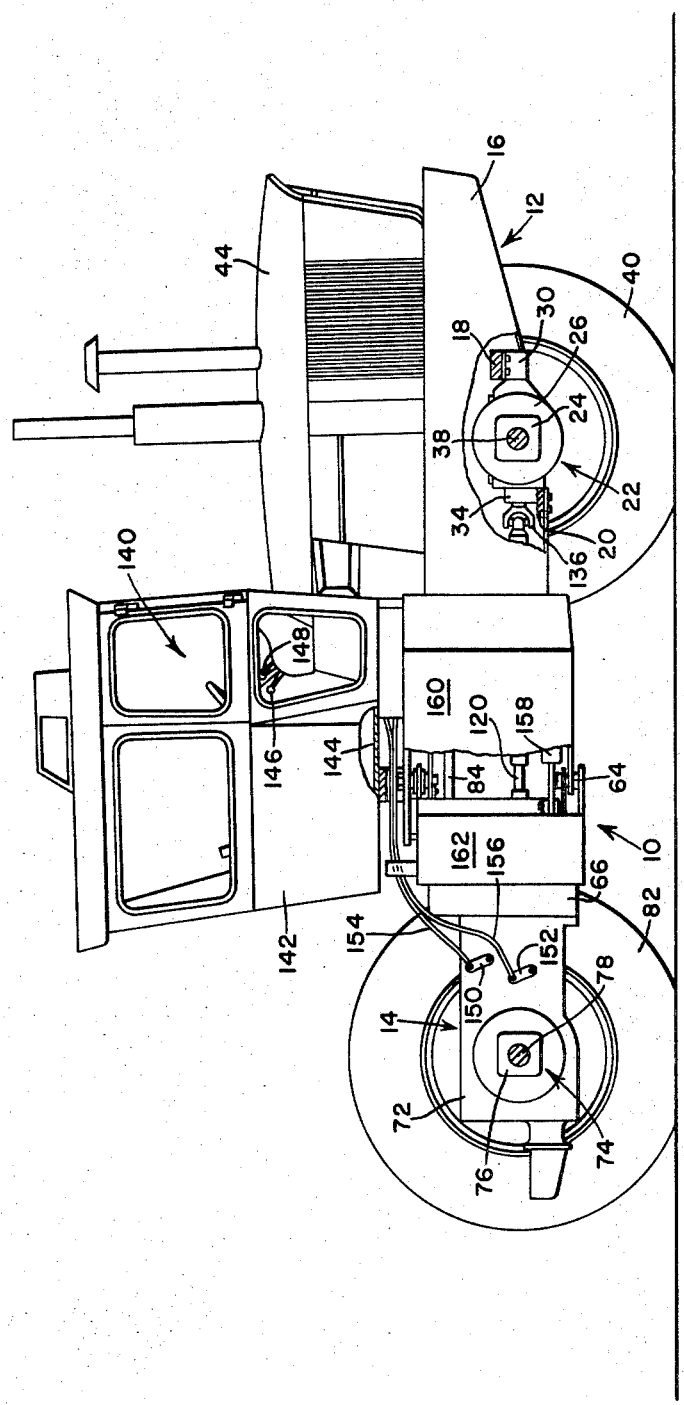

INVENTORS
D. F. LEMONS
G. L. MARQUART
S. HERSCOVICI

3,701,393

ARTICULATED TRACTOR

BACKGROUND OF THE INVENTION

Most agricultural and industrial tractors have been two-wheel drive vehicles, with rear drive wheels and steerable front wheels. Although most commercially produced tractors are still of the two-wheel drive variety, with the trend toward larger tractors, with their requirement for greater traction, four-wheel drive tractors are becoming more and more common. In fact, most major manufacturers of agricultural and industrial tractors today offer at least one relatively large, four-wheel drive tractor. Most of the larger four-wheel drive tractors are articulated about a vertical axis, the tractor being steered by swinging the front frame section relative to the rear frame section about the axis of articulation.

Heretofore, the relatively large, commercially available, articulated, four-wheel drive tractors have utilized somewhat the same overall arrangement of components, namely an articulated frame with front and rear drive axles respectively mounted on the front and rear frame sections, the engine and transmission being on the front frame section with a front drive shaft extending forwardly from the transmission to the front drive axle and a rear drive shaft extending rearwardly from the transmission across the axis of articulation to the rear drive axle. The operator's station has conventionally been mounted on the front frame structure above the transmission to afford the operator adequate visibility. This arrangement has the advantage of having only one drive shaft extending across the axis of articulation, so that only one pair of universal joints are required, and the drive shaft with the universal joints is rotating only at transmission output speed, rather than the substantially higher engine output speed. This arrangement has become more or less conventional on the larger four-wheel drive articulated agricultural tractors and industrial tractors, such as are widely used in log-skidding operations, although other arrangements have been proposed in the past for smaller, less sophisticated vehicles. For example, certain old patents have shown an arrangement with both the transmission and the operator's station on the rear frame, although such a vehicle has apparently not been commercially produced.

SUMMARY OF THE INVENTION

According to the present invention, there is provided an articulated four-wheel drive vehicle with a novel arrangement of components. More specifically, there is provided an articulated four-wheel drive tractor with an oscillating front axle and a rigid rear axle driven by an engine on the front frame through a transmission on the rear frame, which is controlled by the operator at an elevated operator's station on the front frame. In accordance with the above arrangement of components, there are two drive shafts extending across the axis of articulation, the upper drive shaft being driven by the engine at engine speed and providing the input to the transmission, the output shaft of which is connected to the front drive axle through a second drive shaft across the axis of articulation.

Another feature of the invention resides in the drop-type gear box on the rear frame, which transmits the power to the transmission and also to the tractor power take-off.

An important advantage of the above arrangement of components resides in the fact that it permits the use of the same transmission, transmission housing, differential, differential housing, and rear axle as used on conventional two-wheel drive tractors, so that additional tooling and production equipment are not needed to produce the major drive components. The arrangement also permits the use of the same clutch housing, operator's station components, and hood as are used on production-type two-wheel drive tractors, so that throughout the tractor, a maximum number of already available components are utilized, substantially reducing the cost of the tractor. The above is particularly true, since the relatively large four-wheel drive tractors are relatively low-volume production machines compared to the two-wheel drive tractors, and the use of common components substantially reduces the cost of the tractor.

Still another feature of the invention resides in the construction of the drop-housing type gear box, which transmits the engine power to the power take-off shaft and to the transmission input.

BRIEF DESCRIPTION OF THE DRAWINGS

FIG. 1 is a side elevation view of a tractor embodying the invention, with portions of the tractor broken away to more clearly illustrate the invention.

DESCRIPTION OF THE PREFERRED EMBODIMENT

Figure 2A:
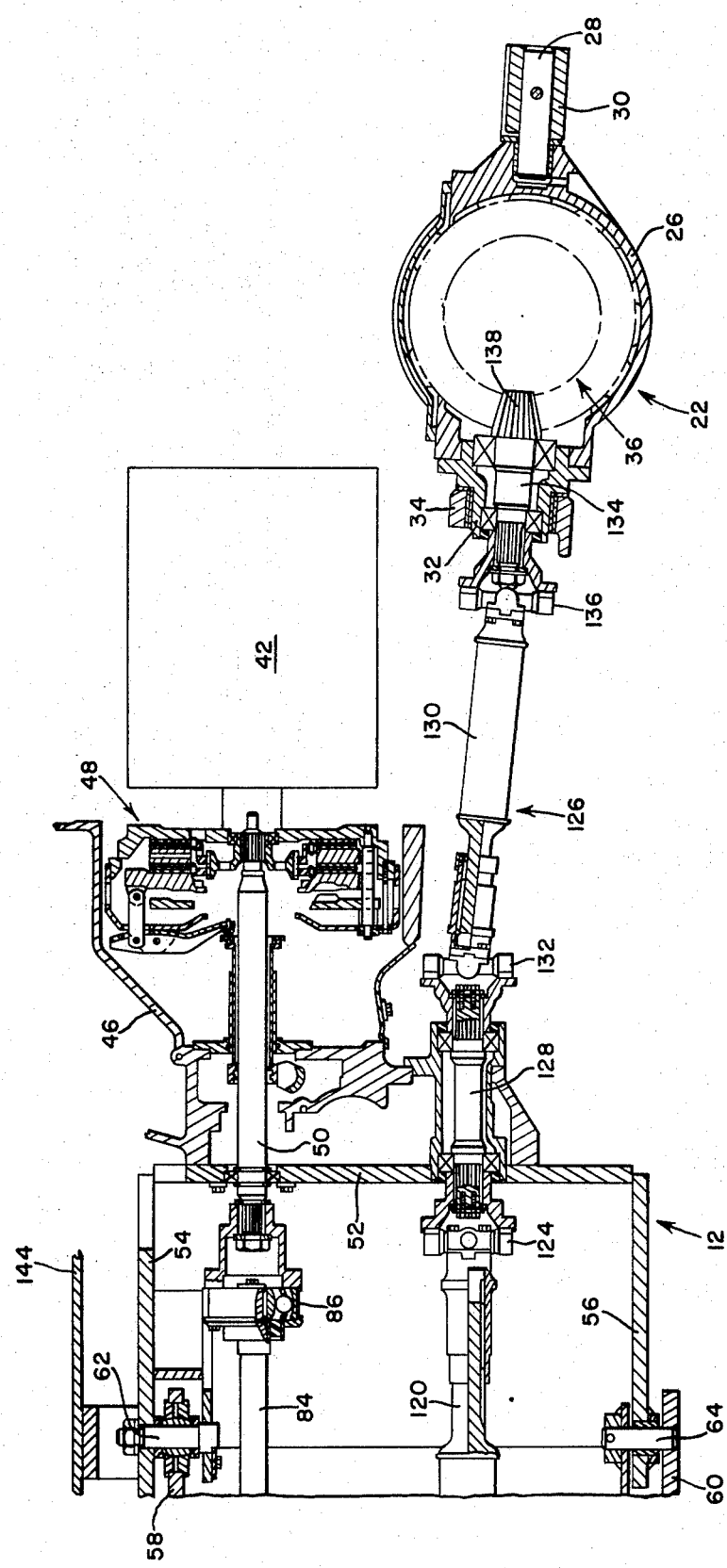
FIGS. 2(a) and 2(b) are respectively the front and rear halves of a single fore-and-aft vertical section through the center of the tractor drive train.
Figure 2B:
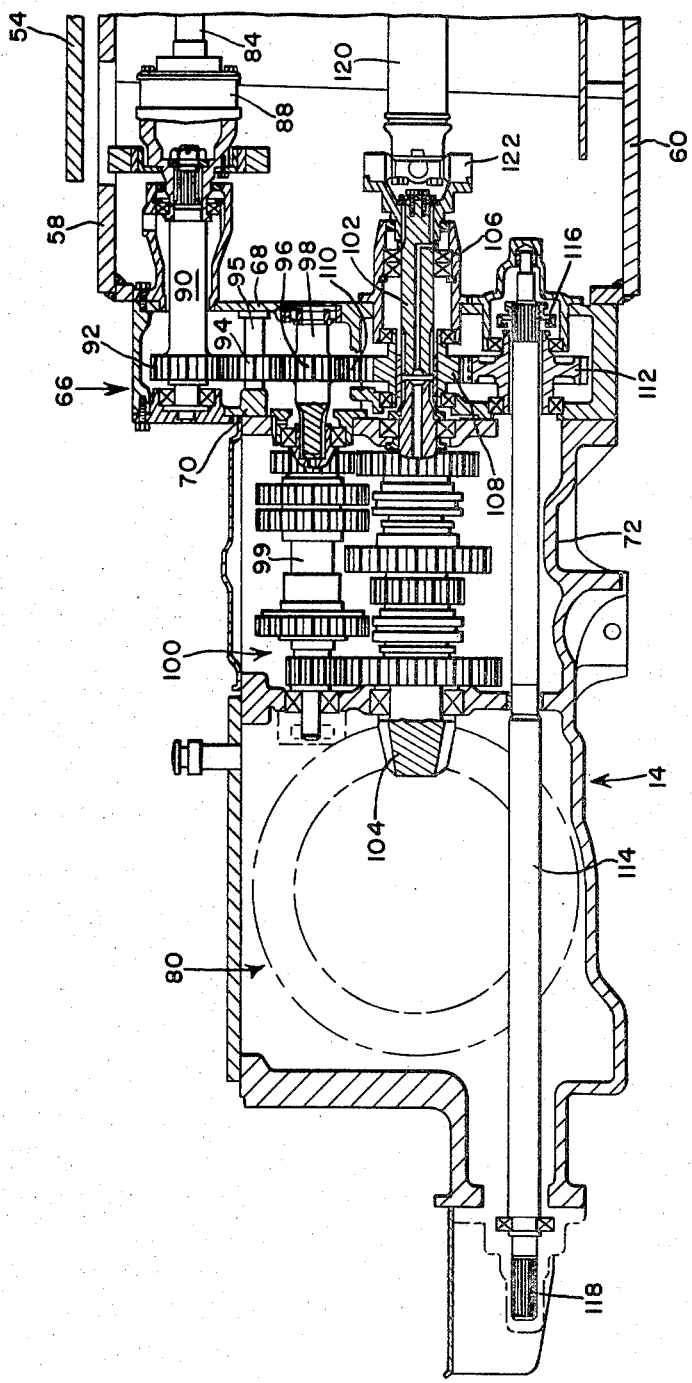

The invention is embodied in a four-wheel drive articulated tractor having an articulated main frame 10 formed by pivotally connected front and rear frame structures 12 and 14 respectively.

The front frame structure includes a pair of fore-and-aft elongated beams 16 on opposite sides of the frame structure, which are rigidly connected by a pair of transverse beams 18 and 20 as well as by additional structure. The front frame structure is supported on an oscillating front axle assembly, indicated in its entirety by the numeral 22.

The front axle assembly 22 includes a pair of axle housings 24 extending transversely from opposite sides of a central differential housing 26, which is pivotally mounted on a front pivot 28 carried by a bracket 30 depending from the transverse beam 18. The differential housing includes a rearwardly extending annular element 32 coaxial with the pivot 28 and journaled in a bracket 34 mounted on the transverse beam 20, so that the entire front axle assembly is free to oscillate about the fore- and-aft axis of the pivot 28 and the annular element 32. As is conventional, differential gearing 36 is mounted in the differential housing 26 and drives a pair of front drive axles 38, which respectively drive front drive wheels 40.

An internal combustion engine 42, schematically illustrated in FIG. 2(a), is mounted on the front frame structure 12 generally above the front axle and is covered by a front hood structure 44. A clutch and flywheel housing 46 is rigid with the front frame structure 12 and houses a conventional clutch mechanism 48, operative to selectively connect and disconnect the engine to a fore- and-aft engine output shaft 50. The rearward end of the engine output shaft 50 is journaled in a vertical, transverse plate 52, which also forms a part of the front frame structure 12 and is connected to the rear end of the clutch and flywheel housing 46. Extending rearwardly from the upright plate 52 are upper and lower, rigid, vertically spaced, horizontal plates 54 and 56 respectively. The upper and lower plates 54 and 56 are respectively adjacent and in overlapping relationship with upper and lower horizontal plates 58 and 60 respectively, which form a part of the rear frame structure 14. The overlapping upper plates 54 and 56 are connected by a vertical pivot pin 62, and the overlapping lower plates 56 and 60 are connected by a pivot pin 64, the generally vertical pivot pins 62 and 64 being axially aligned and providing the articulation between the front and rear frame structures 12 and 14.

Rigidly secured to the rear of the plates 58 and 60 is a gear box housing 66 having generally upright front and rear walls 68 and 70 respectively. The front wall 68 is attached to the plates 58 and 60 and the rear wall 70 is rigidly attached to a fore- and-aft extending transmission housing 72. The transmission housing is of conventional construction substantially identical to production housings and forms part of the rear frame structure 14. A rear axle assembly, indicated generally by the numeral 74, includes a pair of axle housings 76 rigidly extending in opposite lateral directions from the opposite sides of the transmission housing 72 and supporting a pair of rear axles 78 driven by differential gearing 80 in the rearward end of the transmission housing 72 in the conventional manner. A pair of rear drive wheels 82 are respectively mounted on and driven by the rear axles 78 to support the rear frame structure 14 above the ground.

The rearward end of the engine output shaft 50 is coaxially connected to an upper drive shaft 84, which extends rearwardly across the axis of articulation and includes front and rear ball-type universal joints 86 and 88 respectively. The universal joints 86 and 88 are respectively disposed the same distance to the front and to the rear of the axis of articulation and therefore are articulated at equal angles when the front and rear frame structures swing relative to one another. As is apparent, the drive shaft 84 is rotating at engine output speed and the rearward end of the drive shaft 84 is coaxially splined to an input shaft 90 journaled in and extending forwardly from the gear box housing 66.

A first or input spur gear 92 is affixed to the shaft 90 and drivingly meshes with the second gear 94 on a countershaft 95 also within the housing 66. The gear 94 meshes with and drives a third gear on a fore- and-aft transmission input shaft 98, which also has its front and rear ends journaled in the front and rear walls 68 and 70 of the gear box housing 66. The rearward end of the shaft 98 is splined to the upper shaft 99 of a transmission mounted within the transmission housing 72 and indicated in its entirety by numeral 100. The transmission 100 is of known construction and currently used on some of the tractors produced by the applicants' assignee, and therefore will not be described in detail. The transmission 100 includes a fore-and-aft output shaft 102 below the shaft 99. The rearward end of the shaft 102 is provided with a bevel gear 104, which drives the differential gearing 80, and the forward end of the shaft 102 extends forwardly through the gear box housing 66 and is journaled in a bearing box 106 in the front wall 68 of the gear box.

An annular gear 108 is coaxially journaled on the shaft 102 within the gear box 66 and is driven by a spur gear 110, which, in turn, is driven by the gear 96. The gear 108 meshes with and drives a PTO gear 112, which is journaled on a fore-and-aft PTO shaft 114 and is connectible thereto by a PTO clutch 116 in a known manner. The PTO shaft 114 spans the length of the transmission housing 72 and terminates rearwardly in a conventional PTO output spline 118 projecting rearwardly from the rearward end of the transmission housing 72. Thus, the PTO shaft is directly connectible to the engine driven shaft 90 through the spur gear train formed by the gears 92, 94, 96, 110, 108, and 112, all of which are disposed in the same vertical plane within the gear box housing 66.

The forward end of the transmission output shaft 102 is coaxially splined to a lower drive shaft 120 having a rearward universal joint 122 at its rearward end and a front universal joint 124 at its forward end, the universal joints 122 and 124 being respectively equally spaced to the front and to the rear of the axis of articulation.

The front universal joint 124 is coaxially splined to a front drive shaft, indicated in its entirety by the numeral 126. The front drive shaft 126 includes a rear section 128 journaled in the upright plate 52 and connected to a forwardly and downwardly inclined center section 130 by universal joint 132. The front end of the center section 130 is connected to a horizontal forward section 134 by universal joint 136. The front section 134 coaxially extends through the annular element 32 of the front differential housing 26 and has a bevel gear 138, which drives the differential gearing 36 in a well known manner. Thus, the front axle assembly 22 oscillates about the front section 134 of the front drive shaft 126. The slight downward incline of the center section 130 is necessary to fit the components together, using already available components. Since the tire sizes are the same, the incline requires a slight corresponding tilt of the components on the rear frame portion, the axis of articulation formed by the pivots 62 and 64 being inclined upwardly and rearwardly approximately 1 ½° from the vertical.

An operator's station 140 is mounted on the front frame structure 12 and includes a cab 142 and a generally horizontal platform or floor 144 spaced a short distance above the horizontal plate 54 on the front frame structure. Conventional controls are mounted at the operator's station, including a gear selector lever 146 and a range selector lever 148, which are respectively connected to control levers 150 and 152 on the right side of the transmission housing 72 by Bowden cables 154 and 156 respectively. When the transmission 100 is used on a rigid frame tractor, the control levers 150 and 152 are rigidly connected to the gear selector lever 146 and the range selector lever 148 by a suitable linkage, the use of the flexible cables 154 and 156 permitting the relative movement between the front and rear frame structures without affecting the position of the transmission control levers. As is apparent, the cables 154 and 156 extend forwardly in the horizontal gap between the operator's station floor 144 and the plates 54 and 58, which form parts of the frame structures, the forward ends of the cables having a suitable connection (not shown) with the levers 146 and 148.

The tractor is steered by extending or retracting hydraulic cylinders 158 operative between the front and rear frame structures 12 and 14 on opposite sides of the axis of articulation, as is well known. A pair of fuel tanks 160 are mounted on opposites sides of the front frame structure outwardly of the pivots 62 and 64, the rearward portion of the right fuel tank 160 being broken away in FIG. 1 to show the pivot pins. Similarly, a hydraulic reservoir 162 is mounted on the rear frame structure 14 rearwardly of the fuel tanks 160.

As is apparent from the above, the tractor utilizes a maximum number of previously produced major components, such as the front axle assembly 22, the rear axle assembly 74, the transmission 100 and the transmission housing 72, all of which represent major costs in a tractor. The arrangement of components does require an additional drive shaft across the axis of articulation with the usual universal joints in each drive shaft. Actually, in commercially produced tractors, it had been thought to be impractical to cross the axis of articulation with a drive shaft operating at engine speed, such as the shaft 84, and the above-described tractor therefore represents a departure from conventional construction in this area. However, in the previous designs, if a live PTO were provided, the PTO would have to cross the axis of articulation from the transmission on the front frame, and the present arrangement eliminates any universal joints in the PTO drive system, so that there is no net increase in the number of universal joints. With the above-described drive system, with its maximum utilization of previously produced components and the elimination of a considerable amount of tooling and other manufacturing costs, a relatively inexpensive articulated four-wheel drive tractor has been designed.

We claim:

1. An articulated tractor comprising: a front frame structure; a rear frame structure; pivot means pivotally connecting the front and rear frame structures for articulation about a generally vertical axis; a transversely extending rear axle assembly rigidly connected to the rear frame structure and including a differential and a pair of oppositely extending drive axles with a pair of rear drive wheels respectively connected to and driven by the drive axles on opposite sides of the rear frame structure; a transversely extending front axle assembly pivotally connected to the front frame structure for oscillating about a central fore- and-aft axis relative to the front frame structure and having a differential and a pair of oppositely extending drive axles with a pair of front drive wheels respectively connected to and driven by the drive axles on opposite sides of the front frame structure; an engine mounted on the front frame structure and having a rearwardly extending output shaft rotating at engine speed; a first drive shaft means driven by and extending rearwardly from the engine output shaft and having front and rear universal joints respectively disposed forwardly and rearwardly of the axis of articulation between the front and rear frame structures; a variable speed transmission means mounted on the rear frame structure and having a fore- and-aft output shaft with its rearward end drivingly connected to the rear differential and its forward end connected to a second drive shaft means below the first drive shaft means and including front and rear universal joints respectively disposed forwardly and rearwardly of the axis of articulation; a gear box having an input shaft coaxially connected to and driven by the first drive shaft means, an output shaft parallel to and below the input shaft drivingly connected to the transmission means and driven by the input shaft by a first gear means; means drivingly connecting the forward end of the second drive shaft means to the front differential; a PTO drive shaft journaled on the rear frame structure, extending in a fore- and-aft direction below the transmission output shaft, and connected to and driven by the first gear means by a second gear means; and an operator's station attached to the front frame structure rearwardly of the engine and generally above the axis of articulation.

2. The invention defined in claim 1 wherein the gear box is rigidly mounted on the rear frame structure forwardly of the transmission means, and the transmission output shaft extends forwardly through the gear box.

3. The invention defined in claim 2 wherein the second gear means includes an annular gear coaxially journaled on the transmission output shaft.

4. The invention defined in claim 2 wherein the first and second gear means conjunctively comprise a train of axially parallel, meshing gears mounted in the gear box in the same vertical plane.

5. An articulated tractor comprising: a front frame structure; a rear frame structure; pivot means pivotally connecting the front and rear frame structures for articulation about a generally vertical axis; a transversely extending rear axle assembly rigidly connected to the rear frame structure including a differential and a pair of oppositely extending drive axles with a pair of rear drive wheels respectively connected to and driven by the drive axles on opposite sides of the rear frame structure; a transversely extending front axle assembly pivotally connected to the front frame structure for oscillating about a central fore- and-aft axis relative to the front frame structure and having a differential and a pair of oppositely extending drive axles with a pair of front drive wheels respectively connected to and driven by the drive axles on opposite sides of the front frame structure; an engine mounted on the front frame structure and having a rearwardly extending output shaft rotating at engine speed; a first drive shaft means driven by and extending rearwardly from the engine output shaft and having front and rear universal joints respectively disposed forwardly and rearwardly of the axis of articulation between the front and rear frame structures; a variable speed transmission mounted on the rear frame structure and having a fore- and-aft output shaft with its rearward end drivingly connected to the rear differential and its forward end connected to a second drive shaft means below the first drive shaft means and including front and rear universal joints respectively disposed forwardly and rearwardly of the axis of articulation; a gearbox having an upright front wall, an upright rear wall attached to the transmission housing, an input shaft extending through the front wall and coaxially connected to and driven by the first drive shaft means, an output shaft extending through the rear wall and drivingly connected to the transmission, and gear means within the gearbox drivingly connecting the input shaft to the output shaft and to a PTO drive shaft extending rearwardly through the rear wall, the transmission output shaft extending forwardly through the gearbox and being journaled therein below the gearbox output shaft; means drivingly connecting the forward end of the second drive shaft means to the front differential; and an operator's station mounted on the front frame structure.

6. An articulated tractor comprising: a front frame structure; a rear frame structure; pivot means pivotally connecting the front and rear frame structures for articulation about a generally vertical axis; a transversely extending rear axle assembly rigidly connected to the rear frame structure including a differential and a pair of oppositely extending drive axles with a pair of rear drive wheels respectively connected to and driven by the drive axles on opposite sides of the rear frame structure; a transversely extending front axle assembly pivotally connected to the front frame structure for oscillating about a central fore- and-aft axis relative to the front frame structure and having a differential and a pair of oppositely extending drive axles with a pair of front drive wheels respectively connected to and driven by the drive axles on opposite sides of the front frame structure; an engine mounted on the front frame structure and having a rearwardly extending output shaft rotating at engine speed; a first drive shaft means driven by and extending rearwardly from the engine output shaft and having front and rear universal joints respectively disposed forwardly and rearwardly of the axis of articulation between the front and rear frame structures; a variable speed transmission means mounted on the rear frame structure and having a fore- and-aft output shaft with its rearward end drivingly connected to the rear differential and its forward end connected to a second drive shaft means below the first drive shaft means and including front and rear universal joints respectively disposed forwardly and rearwardly of the axis of articulation; means drivingly connecting the rearward end of the first drive shaft means to the transmission means; a third drive shaft means connecting the forward end of the second drive shaft to the front differential and including front and rear universal joints respectively adjacent to the front differential and to the forward end of the second drive shaft means; and an operator's station mounted on the front frame structure rearwardly of the engine and generally above the axis of articulation.

7. An articulated tractor comprising: a front frame structure including a pair of rearwardly extending, vertically spaced, generally horizontal plates connected by an upright transverse plate; a rear frame structure including a pair of forwardly extending, vertically spaced, generally horizontal plates respectively adjacent to and partially overlapping the rearwardly extending plates on the front frame structure; a pair of axially aligned, generally vertical pivot pins respectively connecting the upper and lower overlapping plates providing articulation between the front and rear frame structures about a generally vertical axis; a transversely extending rear axle assembly rigidly connected to the rear frame structure and including a differential and a pair of oppositely extending drive axles with a pair of rear drive wheels respectively connected to and driven by the drive axles on opposite sides of the rear frame structure; a transversely extending front axle assembly pivotally connected to the front frame structure for oscillating about a central fore- and-aft axis relative to the front frame structure and having a differential and a pair of oppositely extending drive axles with a pair of front drive wheels respectively connected to and driven by the drive axles on opposite sides of the frame structure; an engine mounted on the front frame structure and having a rearwardly extending output shaft rotating at engine speed and including a main drive clutch means mounted in a housing rigidly connected to said upright plate; a first drive shaft means driven by and extending rearwardly from the engine output shaft and having front and rear universal joints respectively disposed forwardly and rearwardly of the axis of articulation; a gearbox including a housing rigidly connected to the horizontal plates of the rear frame structure, an input shaft coaxially connected to and driven by the first drive shaft means, an output shaft parallel to and below the input shaft and driven by the input shaft by gear means; a variable speed transmission means including a housing rigidly connected to the gearbox housing, an input shaft connected to and driven by the gearbox output shaft, and an output shaft having its rearward end drivingly connected to the rear differential and its forward end connected to a second drive shaft means below the first drive shaft means, said second drive shaft means including front and rear universal joints respectively disposed forwardly and rearwardly of the axis of articulation; and a third drive shaft means extending through and journaled in said upright plate and having its rearward end drivingly connected to the forward end of said second drive shaft means and its forward end connected to the front differential.

8. The invention defined in claim 7 and including an operator's station mounted on the front frame structure rearwardly of the engine and generally above the axis of articulation.

9. The invention defined in claim 8 including manually actuatable transmission control lever means at the operator's station and flexible means extending across the pivot means and operatively connecting the control lever means to the transmission for shifting the transmission in response to movement of the control lever means.

10. The invention defined in claim 8 wherein the operator's station includes a floor spaced above and overlying the upper pair of overlapping frame structure plates.

* * * * *